United States Patent
Saito et al.

(10) Patent No.: US 10,620,561 B2
(45) Date of Patent: Apr. 14, 2020

(54) OPTICAL SCANNING DEVICE AND IMAGE FORMING DEVICE

(71) Applicant: Konica Minolta, Inc., Tokyo (JP)

(72) Inventors: Shinya Saito, Toyokawa (JP); Ryo Hasegawa, Hachioji (JP); Hajime Taniguchi, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/249,727

(22) Filed: Jan. 16, 2019

(65) Prior Publication Data

US 2019/0227455 A1 Jul. 25, 2019

(30) Foreign Application Priority Data

Jan. 25, 2018 (JP) .................................. 2018-010207

(51) Int. Cl.
*G03G 15/04* (2006.01)
*G02B 26/12* (2006.01)

(52) U.S. Cl.
CPC ..... *G03G 15/04036* (2013.01); *G02B 26/123* (2013.01)

(58) Field of Classification Search
CPC ....... G03G 15/04036; G03G 15/04072; G02B 26/123
See application file for complete search history.

(56) References Cited

U.S. PATENT DOCUMENTS

2002/0036683 A1* 3/2002 Yokoyama ........... G02B 26/123
 347/118
2006/0187513 A1* 8/2006 Ohsugi .................. G02B 26/12
 359/212.1

FOREIGN PATENT DOCUMENTS

JP 2013-186335 A 9/2013

* cited by examiner

*Primary Examiner* — Sandra Brase
(74) *Attorney, Agent, or Firm* — Osha Liang LLP

(57) ABSTRACT

An optical scanning device including: a light source; a deflector that deflects light from the light source; an optical element that guides light deflected by the deflector on an optical path to a photosensor; and a housing that accommodates the deflector and the optical element. The housing is integrally formed and includes a bottom plate, a side wall standing upright from a periphery of a main surface of the bottom plate, and a pair of ribs parallel with each other and standing upright from the bottom plate. Both longitudinal ends of each of the ribs in plan view are joined to the side wall. A region of the bottom plate between the ribs in the plan view has a portion displaced farther upward in an upright direction of the side wall than other regions of the bottom plate.

20 Claims, 13 Drawing Sheets

Prior Art

OPTICAL SCANNING DEVICE AND IMAGE FORMING DEVICE

CROSS-REFERENCE TO RELATED APPLICATIONS

This application claims priority to Japanese Patent Application No. 2018-010207 filed Jan. 25, 2018, the contents of which are hereby incorporated herein by reference in their entirety.

BACKGROUND

The present invention relates to optical scanning devices and image forming devices, and in particular to techniques for suppressing warping of housings in optical scanning devices.

Among electrophotographic image forming devices are image forming devices that use an optical scanning device to form an electrostatic latent image through exposure of a photoreceptor. An optical scanning device scans a photoreceptor surface with a laser beam by deflecting the laser beam emitted from a laser diode (LD), by using a deflecting mirror and an optical element housed in a housing. The deflecting mirror is held by a deflector, and the deflector is generally positioned near a center of the housing.

The deflector drives the deflecting mirror to rotate during exposure (scanning), but the center of gravity of the deflecting mirror is not on the rotation axis, and therefore the deflecting mirror vibrates due to the rotation. When the vibration of the deflecting mirror is transmitted to the optical element via the deflector and the housing, and these members vibrate, beam performance on the photoreceptor (image plane) changes.

The housing has a lowest rigidity around the center of the housing, and therefore when the deflector positioned near the center of the housing vibrates, the vibration tends to become large. Further, in order to increase a number of images formed per unit time, or increase resolution, it becomes necessary to increase rotation speed of the deflecting mirror. However, when the rotation speed of the deflecting mirror is increased, vibration of the deflecting mirror becomes larger. Thus, if these contributing factors overlap, there is a risk of image deterioration due to a change in beam performance.

In response to such circumstances, for example, countermeasures have been proposed such as increasing rigidity in the vicinity of the center of the housing (Japanese Patent Application Publication 2013-186335). More specifically, as illustrated in FIG. 12, in a housing 12 that has a rectangular bottom plate 1201 and a side wall 1202 standing upright from the periphery of the bottom plate 1201, ribs 1203 stand upright in the vicinity of a central portion of the bottom plate 1201, and ends of the ribs 1203 connect with the side wall 1202.

This increases rigidity of a central portion of the housing 12, and therefore even when vibration of the deflecting mirror 1204 is transmitted to the bottom plate 1201, vibration of the bottom plate 1201 is restricted by the ribs 1203. Accordingly, vibration energy transmitted from the bottom plate 1201 to the optical element 1205 and the like is suppressed, suppressing vibration of the optical element, and therefore it is possible to prevent image deterioration.

The housing 12 is formed by casting a high temperature mold material in molds 1301, 1302, as illustrated in FIG. 13A. Heat of the mold material is conducted to the molds 1301, 1302, and further radiated from the molds 1301, 1302 to surrounding space. Thus, peripheral portions of the molds 1301, 1302 become low temperature regions.

Further, among spaces surrounded by the bottom plate 1201 and the side wall 1202, spaces 1311, 1312 partitioned by the ribs 1203 both have low temperature regions of the molds 1301, 1302 above, below, and on the other side of the side wall 1202, and therefore the spaces 1311, 1312 become mid-range temperature regions of the mold 1301. A space 1313 sandwiched between the ribs 1203 has low temperature regions of the molds 1301, 1302 above and below, but is sandwiched between the spaces 1311, 1312, which mid-range temperature regions, making dissipation of heat difficult, and therefore the space 1313 becomes a high temperature region of the mold 1301.

As illustrated in FIG. 13B, in a process in which a mold material of a housing 1330 is solidified by cooling from a high temperature state, if surface temperatures of molds 1321, 1322 in contact with two main surfaces of a bottom plate 1331 are different, a shrinking force is greater on a high temperature side of the bottom plate 1331 than on a low temperature side. As a result, a difference in shrinkage occurs between two primary faces of the bottom plate 1331, meaning the bottom plate 1331 warps after casting, bending out towards what was the low temperature side.

When the bottom plate 1331 of the housing 1330 warps, accuracy of dimensions of the housing 1330 cannot be ensured, and therefore misalignment can occur between the deflector and the optical element, and accurate beam performance on an image plane cannot be ensured.

SUMMARY

One or more embodiments of the present invention provide an optical scanning device and an image forming device equipped with a housing that has highly accurate dimensions.

According to one or more embodiments of the present invention, an optical scanning device comprises: a light source; a deflector that deflects light from the light source; an optical element that guides light deflected by the deflector on an optical path to a photosensitive member; and a housing accommodating the deflector and the optical element, wherein the housing is integrally formed and includes a bottom plate, a side wall standing upright from a periphery of a main surface of the bottom plate, and a pair of ribs parallel with each other and standing upright from the bottom plate, both longitudinal ends of each of the ribs in plan view being joined to the side wall, and a region of the bottom plate between the ribs includes a portion displaced farther upward in an upright direction of the side wall than other regions of the bottom plate.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the invention.

DETAILED DESCRIPTION

Hereinafter, embodiments of the present invention will be described with reference to the drawings. However, the scope of the invention is not limited to the disclosed embodiments.

In an optical scanning device and image forming device pertaining to one or more embodiments of the present invention, a housing of the optical scanning device is partitioned by two ribs standing upright from a bottom plate, and a central portion of the bottom plate sandwiched between two ribs is higher than portions of the bottom plate to either side.

(1-1) Configuration of Image Forming Device

An image forming device pertaining to one or more embodiments is a tandem-type digital color printer that, when connected to a communication network such as a local area network (LAN) and upon receiving a print job from another device such as a personal computer (PC), forms toner images from yellow (Y), magenta (M), cyan (C), and black (K) toner, transfers the toner images, superimposing them to form a color image, then transfers and fixes the color image to a recording sheet.

Figure 1:
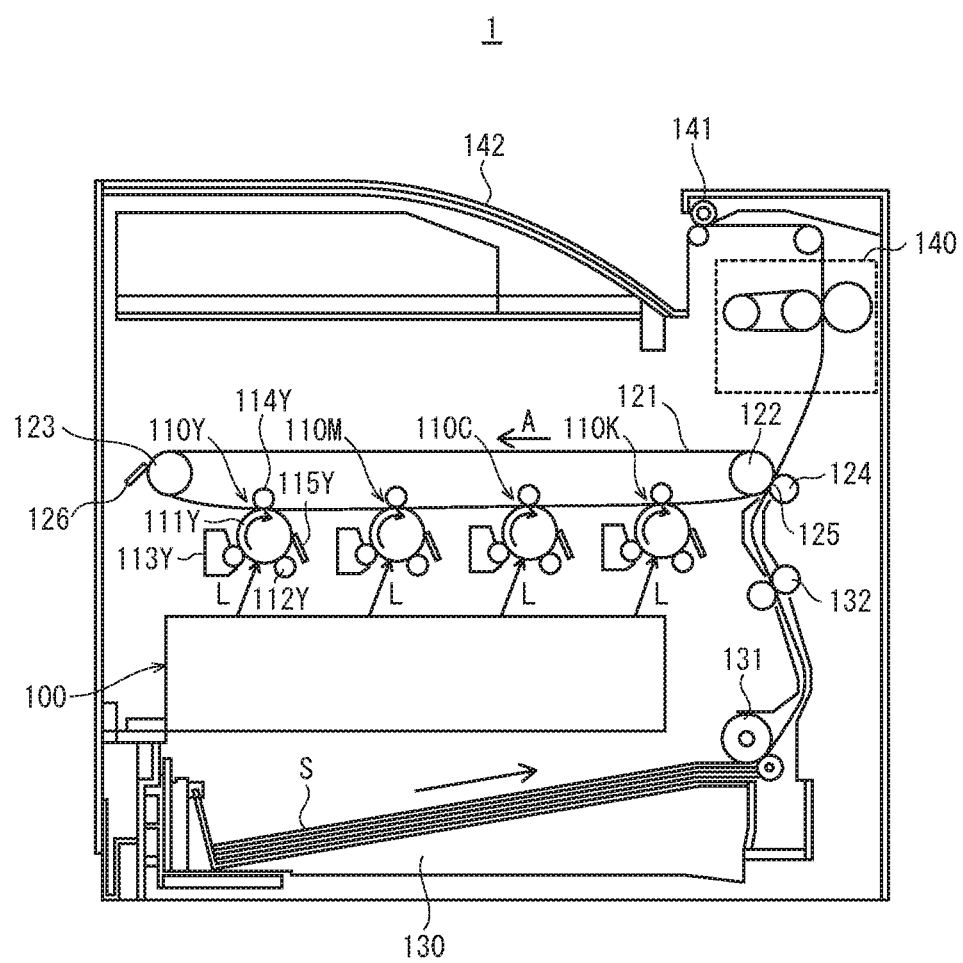
FIG. 1 is a diagram illustrating a main configuration of an image forming device 1 according to one or more embodiments.

As illustrated in FIG. 1, the image forming device 1 includes an optical scanning device 100, imaging units 110Y, 110M, 110C, 110K, a paper cassette 130, a fixing device 140, and other elements. The imaging units 110Y, 110M, 110C, 110K each have the same structure, and therefore the imaging unit 110Y is described below as an example. The optical scanning device 100 is common to the imaging units 110Y, 110M, 110C, 110K.

The imaging unit 110Y includes a photoreceptor drum (photosensitive member, photosensor) 111Y, a charging device 112Y, a developer device 113Y, a primary transfer roller 114Y, and cleaner 115Y. The charging device 112Y, the developing device 113Y, the primary transfer roller 114Y, and the cleaner 115Y are disposed in this order around an outer circumferential surface of the photoreceptor drum 111Y.

The charging device 112Y causes the outer circumferential surface of the photoreceptor drum 111Y to be uniformly charged. The optical scanning device 100 exposes the outer circumferential surface of the photoreceptor drum 111Y to light to form an electrostatic latent image. The developer device 113Y supplies Y color toner to the outer circumferential surface of the photoreceptor drum 111Y to develop the electrostatic latent image to form a Y color toner image.

The primary transfer roller 114 is disposed opposite the photoreceptor drum 111Y with an intermediate transfer belt 121 disposed therebetween, and the Y color toner image on the outer circumferential surface of the photoreceptor drum 111Y is electrostatically transferred (primary transfer) onto the intermediate transfer belt 121. After the primary transfer, the cleaner 115Y scrapes off toner remaining on the outer circumferential surface of the photoreceptor drum 111Y and discards it.

The intermediate transfer belt 121 is an endless belt, is suspended around a driving roller 122 and a driven roller 123, and is driven to rotate in the direction of an arrow A in FIG. 1. The imaging units 110Y, 110M, 110C, 110K that form Y, M, C, K color toner images transfer the Y, M, C, K toner images in accordance with the rotary driving of the intermediate transfer belt 121 so as to be superimposed on each other to form a color toner image.

A secondary transfer roller 124 is in pressure contact with the driving roller 122, sandwiching the intermediate transfer belt 121, thereby forming a secondary transfer nip 125. A color toner image on the intermediate transfer belt 121 is conveyed to the secondary transfer nip 125 by the rotary driving of the intermediate transfer belt 121.

The paper cassette 130 stores recording sheets S. A pick-up roller 131 feeds out the recording sheets S stored in the paper cassette 130 one sheet at a time. A leading edge of a fed out recording sheet S is pushed against a resist roller 132, correcting skew by controlled buckling of the sheet S.

The resist roller 132 is rotationally driven in accordance with a timing at which the color toner image is conveyed to the intermediate transfer belt 121, thereby conveying the recording sheet S to the secondary transfer nip 125. A secondary transfer bias is applied to the secondary transfer roller 124, and the color toner image is electrostatically transferred (secondary transfer) from the intermediate transfer belt 121 to the recording sheet S.

Subsequently, the recording sheet S is fixed by fusing and compression at the fixing device 140, then ejected to an ejection tray 142 by an ejection roller 141. After the secondary transfer, toner remaining on the intermediate transfer belt 121 is scraped off by a cleaner 126 and discarded.

(1-2) Configuration of Optical Scanning Device 100

The following describes configuration of the optical scanning device 100.

Figure 2:
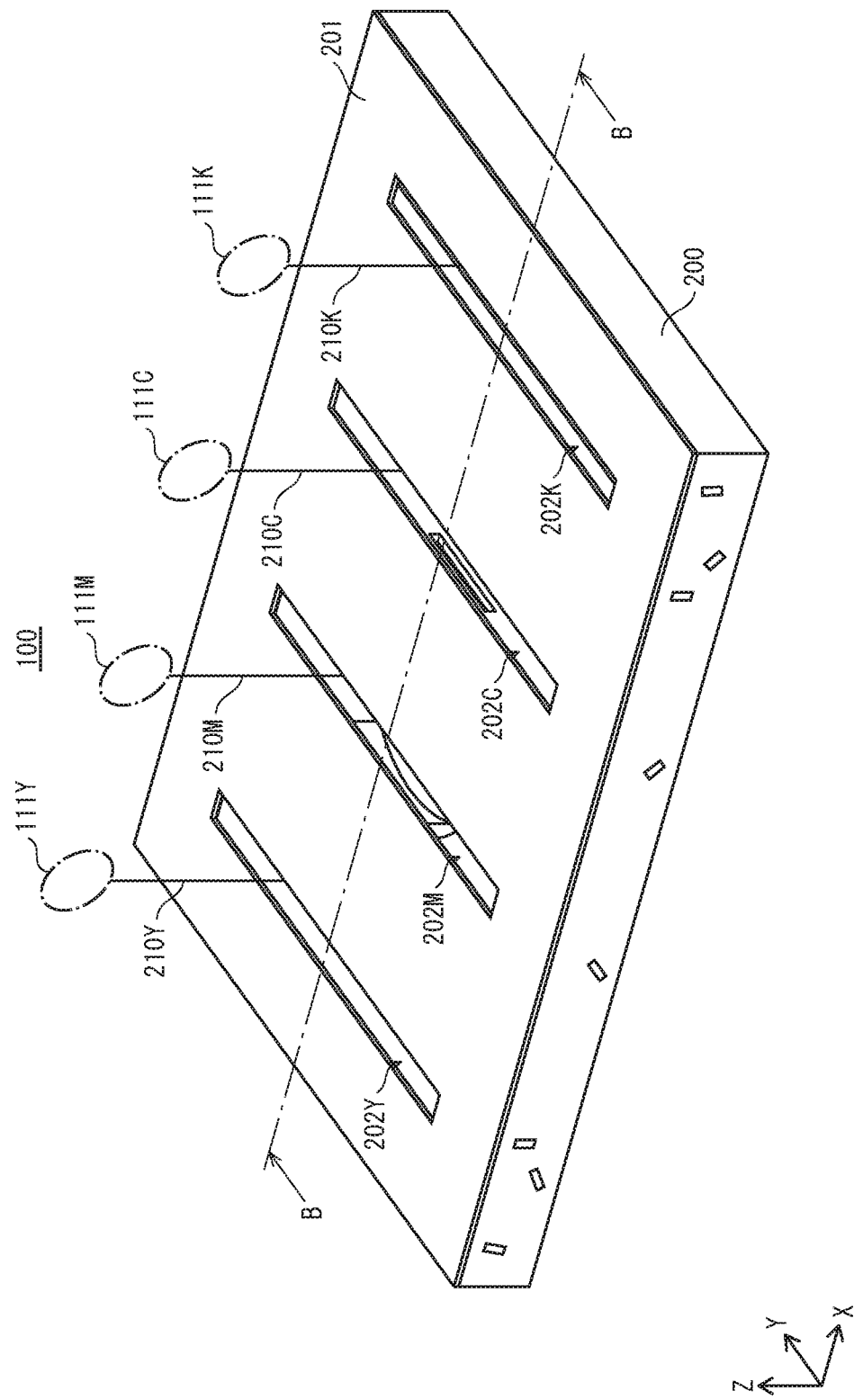
FIG. 2 is a perspective view diagram of an optical scanning device 100 according to one or more embodiments.

As illustrated in FIG. 2, the optical scanning device 100 includes a cover member 201 attached to a housing 200, an outer shape of which is an approximately rectangular cuboid. The cover member 201, which is rectangular, includes slits 202Y, 202M, 202C, 202K. The optical scanning device 100 emits scanning light 210Y, 210M, 210C, 210K from the slits 202Y, 202M, 202C, 202K, exposing the outer circumferential surfaces of the photoreceptor drums 111Y, 111M, 111C, 111K to light.

In the following description, a direction of emission of the scanning light 210Y, 210M, 210C, 210M is direction Z, an axial direction of the photoreceptor drums 111Y, 111M, 111C, 111K (main scanning direction) is direction Y, and a direction perpendicular to both direction Z and direction Y (sub-scanning direction) is direction X.

Figure 3:
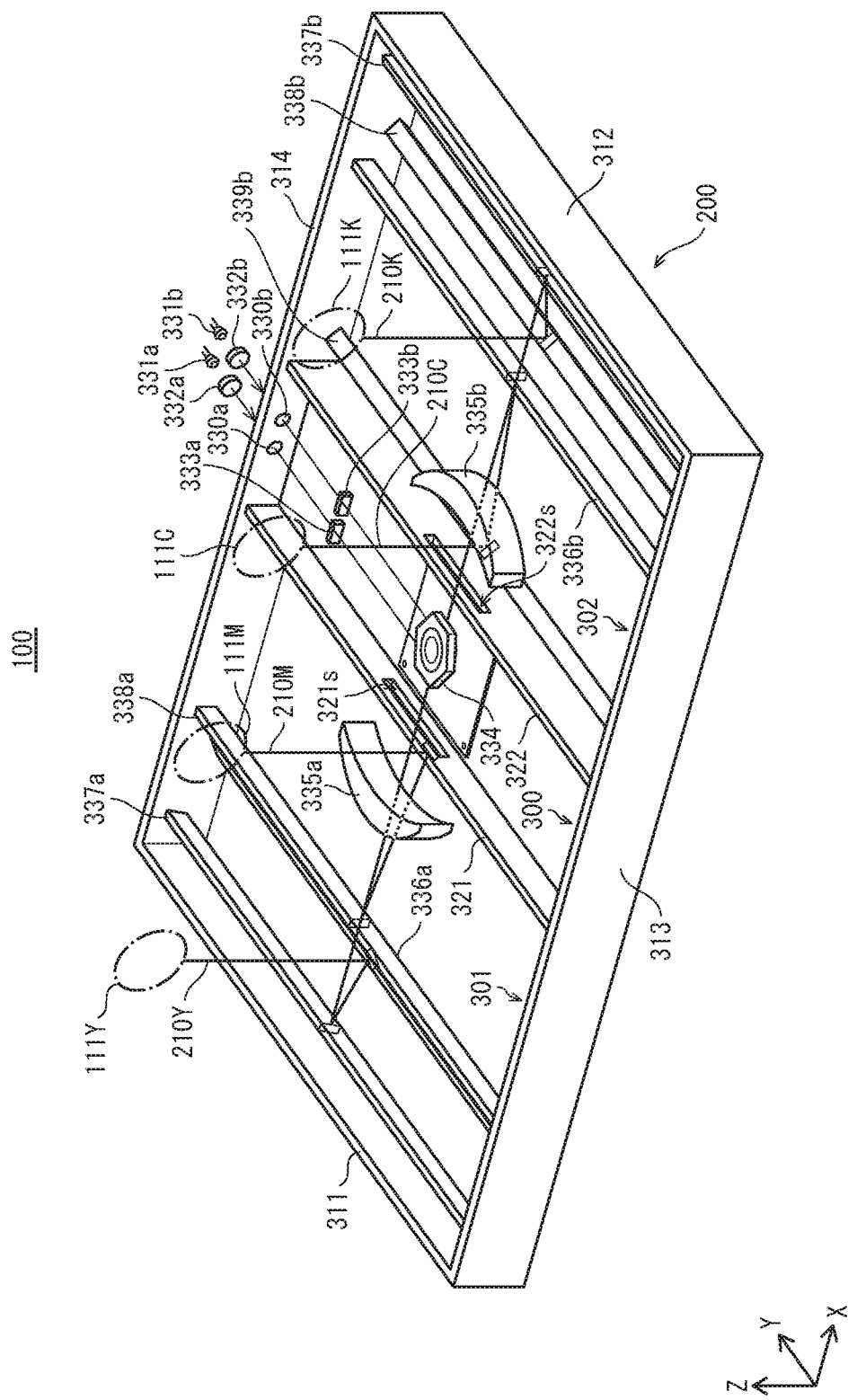
FIG. 3 is a perspective view diagram of the optical scanning device 100 with a cover member 201 removed.
Figure 4:
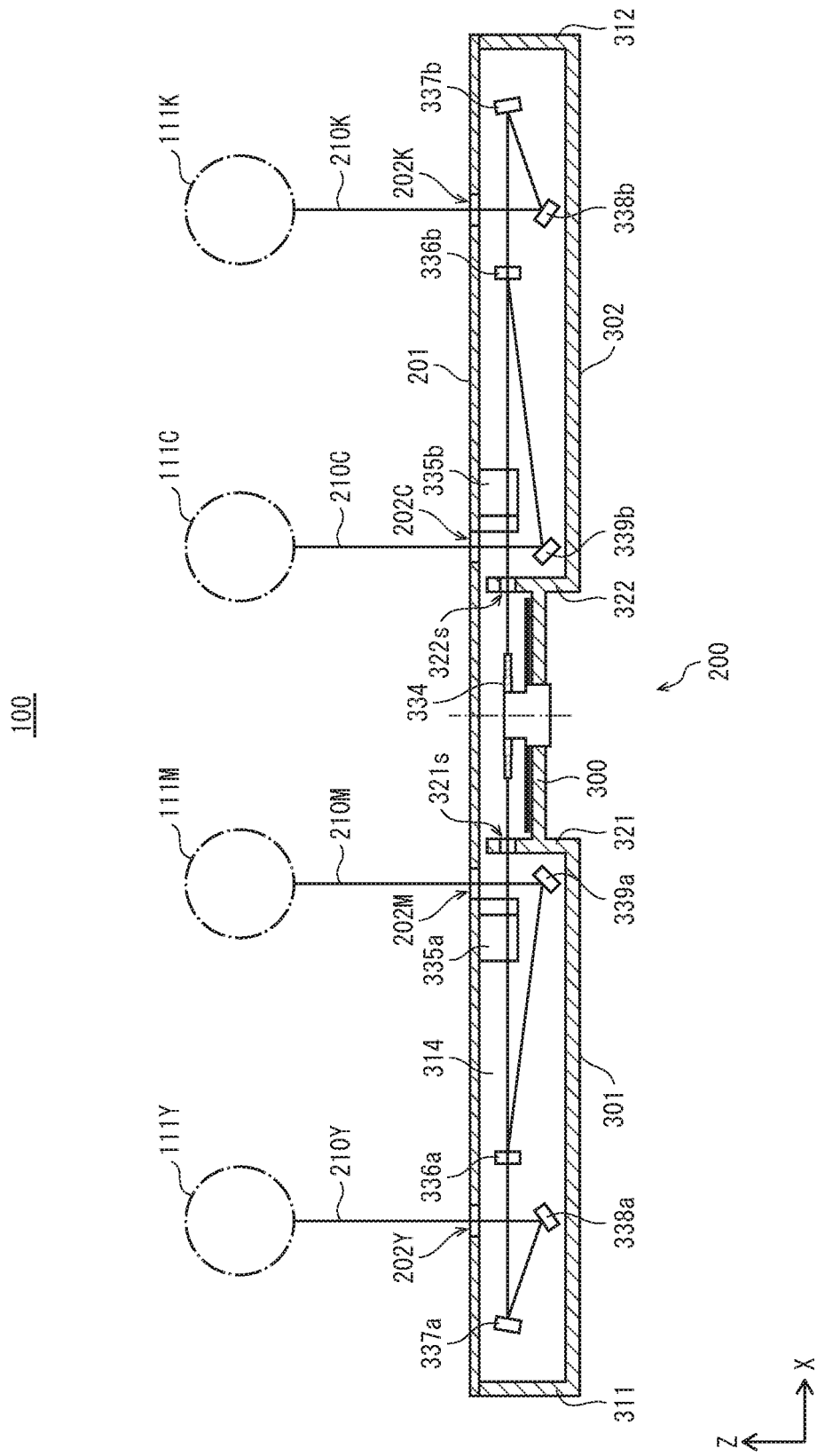
FIG. 4 is a cross-section diagram of the optical scanning device 100 taken along a line B-B in FIG. 2.

As illustrated in FIG. 3 and FIG. 4, the housing 200 includes bottom plates 300, 301, 302. Side walls 311, 312, 313, 314 stand upright from peripheries of the bottom plates 300, 301, 302. The side walls 311, 312 are elongated in direction Y and the side walls 313, 314 are elongated in direction X. Distance in direction Z from ends (upper ends in an upright direction) of the side walls 311, 312, 313, 314 to the bottom plate 300 is approximately half of distance in direction Z from ends of the side walls 311, 312, 313, 314 to the bottom plates 301, 302.

A boundary between bottom plates 300, 301 extends in direction Y, from which a rib 321 stands upright. Similarly, a boundary between bottom plates 300, 302 extends in direction Y, from which a rib 322 stands upright. Ends of the rib 321 and the rib 322 connect to the side walls 313, 314. The housing 200, including the bottom plates 300, 301, 302, the side walls 311, 312, 313, 314, and the ribs 321, 322, is integrally formed by injection molding.

According to one or more embodiments, the ribs 321, 322 are lower than the side walls 311, 312, 313, 314 in direction Z, but may be the same height.

A central portion of the side wall 314 in direction X is provided with through-holes 330a, 330b that are adjacent to each other in direction X, which are fitted with semiconductor laser devices 331a, 331b, respectively. A deflection mirror 334 is disposed in a central portion of the bottom plate 300, and the semiconductor laser device 331a emits two laser beams 210Y, 210M that have polarization planes orthogonal to each other towards the deflection mirror 334. Of the laser beams 210Y, 210M (linearly polarized light), with respect to a deflection surface of the deflection mirror 334, one becomes S polarized light and the other becomes P polarized light.

Similarly, the semiconductor laser device 331b emits two laser beams 210C, 210K that have polarization planes orthogonal to each other towards the deflection mirror 334. Note that emitted beams from the two semiconductor laser devices that emit linearly polarized laser beams may be combined so that, with respect to a deflection surface of the deflection mirror 334, each becomes S polarized light and P polarized light. Further, each S polarized and P polarized laser beam may be a plurality of beams instead of a single beam.

A coupling lens 332a and a cylindrical lens 333a are disposed on an optical path of the laser beams 210Y, 210M from the semiconductor laser device 331a to the deflection mirror 334, the coupling lens 332a being nearer to the semiconductor laser device 331a than the cylindrical lens 333a is. The coupling lens 332a converts the laser beams 210Y, 210M into one of parallel light flux, weakly divergent light flux, and weakly convergent light flux according to properties of an optical system up to the photoreceptor drums 111Y, 111M. The cylindrical lens 333a forms the laser beams 210Y, 210M on a deflection surface of the deflection mirror 334.

Similarly, a coupling lens 332b and a cylindrical lens 333b are disposed on an optical path of the laser beams 210C, 210K from the semiconductor laser device 331b to the deflection mirror 334, the coupling lens 332a converts the laser beams 210C, 210K into one of parallel light flux, weakly divergent light flux, and weakly convergent light flux, and the cylindrical lens 333a forms the laser beams 210C, 210K on a deflection surface of the deflection mirror 334.

Slits 321s, 322s are formed in central portions of the ribs 321, 322 in direction Y. The laser beams 210Y, 210M reflected at the deflection surface of the deflection mirror 334 pass through the slit 321s, pass through a scanning optical system 335a, and are incident on a light beam separator 336a. The light beam separator 336a transmits the laser beam 210Y and reflects the laser beam 210M according to the polarization properties of the laser beams 210Y, 210M.

The laser beam 210Y is reflected by the reflection mirrors 337a, 338a in this order, and is therefore incident on the photoreceptor drum 111Y. The laser beam 210M is reflected by the reflection mirror 339a to be incident on the photoreceptor drum 111M.

Similarly, the laser beams 210C, 210K pass through the slit 322s, pass through a scanning optical system 335b, and are incident on a light beam separator 336b. The laser beam 210C is reflected by the light beam separator 336b and a reflection mirror 339b to be incident on the photoreceptor drum 111C. The laser beam 210K is transmitted through the light beam separator 336b and reflected by reflection mirrors 337b, 338b to be incident on the photoreceptor drum 111K.

According to rotational driving of the deflection mirror 334, the laser beams 210Y, 210M, 210C, 210K scan across and expose to light the photoreceptor drums 111Y, 111M, 111C, 111K.

In order to prevent interference from the laser beams 210M, 210C reflected by the reflection mirrors 339a, 339b, it is beneficial to house the deflection mirror 334 in a cover member. Further, fitting dustproof glass in the slits 202Y, 202M, 202C, 202K of the cover member 201 is beneficial.

Ends of each of the reflection mirrors 337a, 338a, 339a, 337b, 338b, 339b are supported by insertion into the side walls 313, 314, but may be supported by other structures. Support structure of the scanning optical systems 335a, 335b is also not limited to the previously-described embodiments.

(1-3) Temperature Distribution During Manufacture

Figure 5:
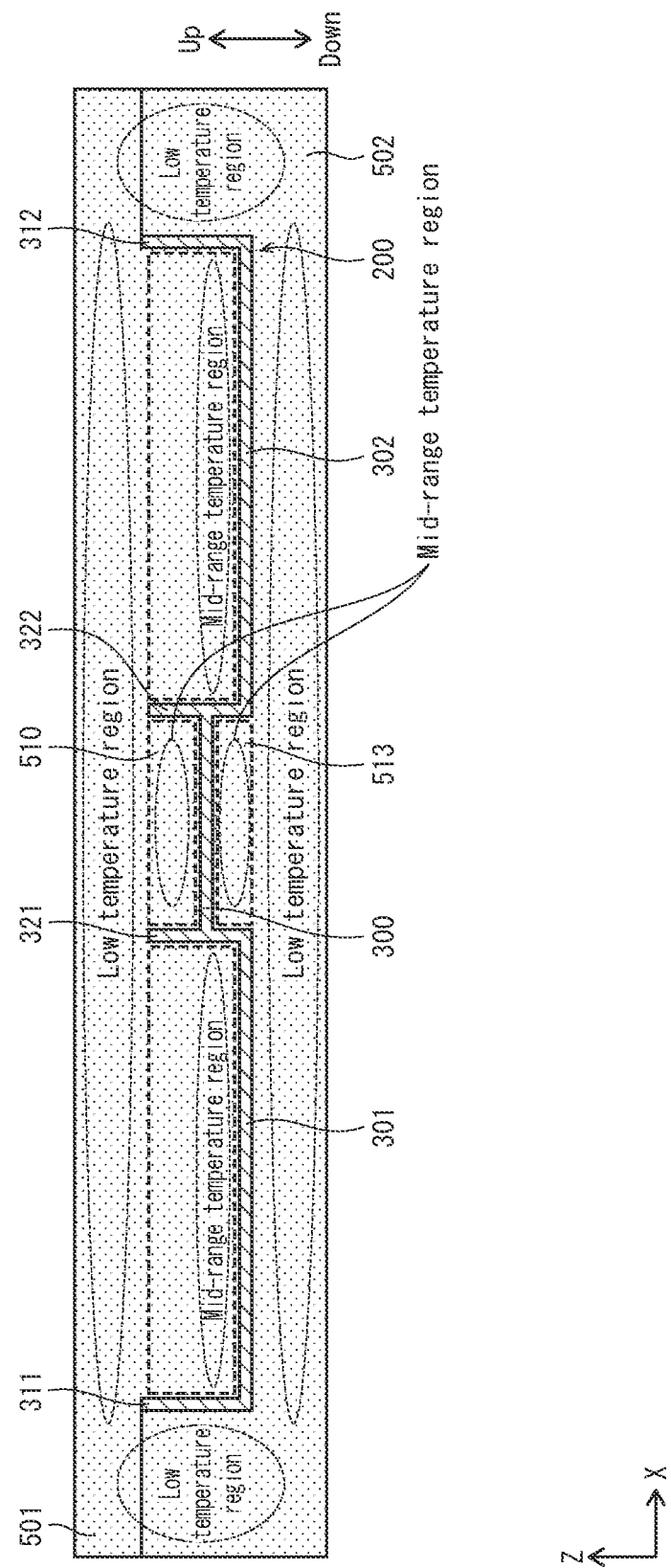
FIG. 5 is a cross-section diagram illustrating a metal mold for injection molding of a housing 200 according to one or more embodiments.

As illustrated in FIG. 5, the housing 200 is formed by injection molding by using a combination of metal molds 501, 502. Since a central portion of the bottom plate 300 in direction X is positioned at a central portion in direction Z, a space 510 surrounded by the bottom plate 300, the side walls 313, 314, and the ribs 321, 322 is shallower than if the bottom plate 300 were in the same position in direction Z as the bottom plates 301, 302, and therefore it is comparatively easier for heat of the metal mold 501 to dissipate upwards in direction Z. Accordingly, during manufacture, the space 510 becomes a mid-range temperature region.

On the other hand, on the metal mold 502 side of the bottom plate 300, a space 513 is surrounded by the bottom plate 300, the side walls 313, 314, and the ribs 321, 322. Thus, the space 513 becomes a mid-range temperature region with a temperature higher than low temperature regions of the metal mold 502 positioned downwards in direction Z from the bottom plates 301, 302.

Accordingly, temperatures of the metal molds 501, 502 sandwiching the bottom plate 300 are low, and therefore occurrence of warping of the bottom plate 300 after manufacture is suppressed.

The following describes additional embodiments of the present invention. An image forming device pertaining to one or more embodiments described below shares a structure largely in common with the image forming device pertaining to the previously-described embodiments, but is different in that a through hole is provided in the bottom plate of the housing 200. The following description primarily focuses on this difference. In the present description, members and elements common among embodiments are assigned the same reference signs.

Figure 6A:
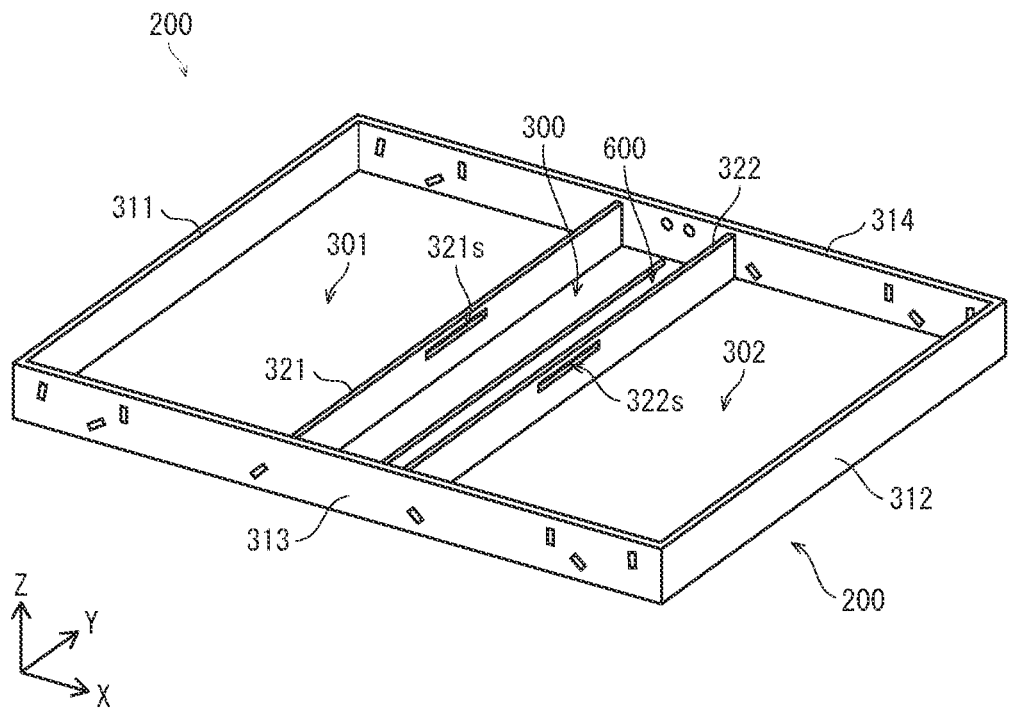
FIG. 6A is a perspective view diagram of the housing 200 pertaining to one or more embodiments.

As illustrated in FIG. 6A, a through hole 600 is provided in a central portion in direction X of the bottom plate 300 of the housing 200.

Figure 6B:
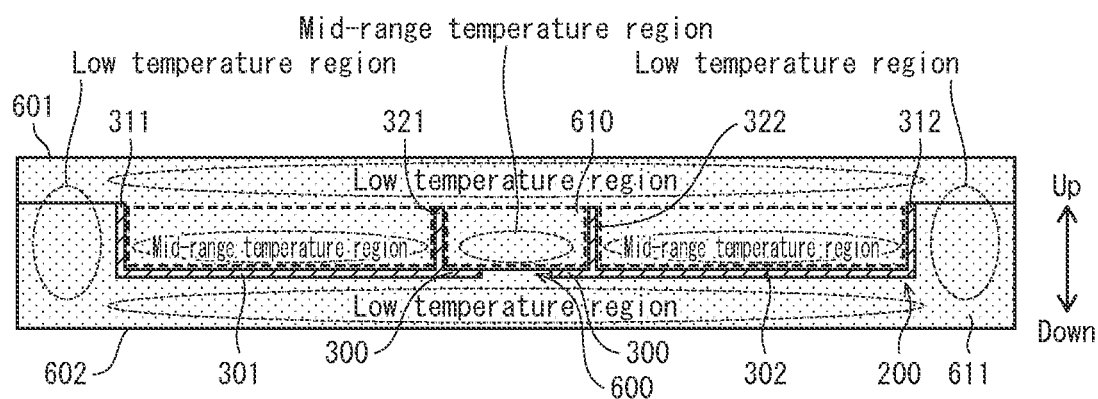
FIG. 6B is cross-section diagram illustrating a metal mold for injection molding of the housing 200.

The housing 200 is formed by injection molding by using a combination of metal molds 601, 602. In order to form the through hole 600, a metal mold (in FIG. 6B, the metal mold 602) is disposed in a position corresponding to the through hole 600. Further, a metal mold has a high thermal conductivity, and therefore heat of a central portion in direction X of the metal mold 601 in a space 610 is conducted to a low temperature region 611 below the housing 200 via the through hole 600, thereby cooling the space 610.

Accordingly, temperature difference between the space 610 and the low temperature region 611 becomes small, and therefore warping of the bottom portion 300 is suppressed.

Note that determination of position of a deflector including the deflection mirror 334 and a deflection motor that provides rotational drive to the deflection mirror 334 may be performed by using the through hole 600.

The following describes additional embodiments of the present invention. An image forming device pertaining to one or more embodiments described below shares a structure largely in common with the image forming device pertaining to the previously-described embodiments, but is different in that steps are provided to the bottom plate 300 of the housing 200.

Figure 7A:
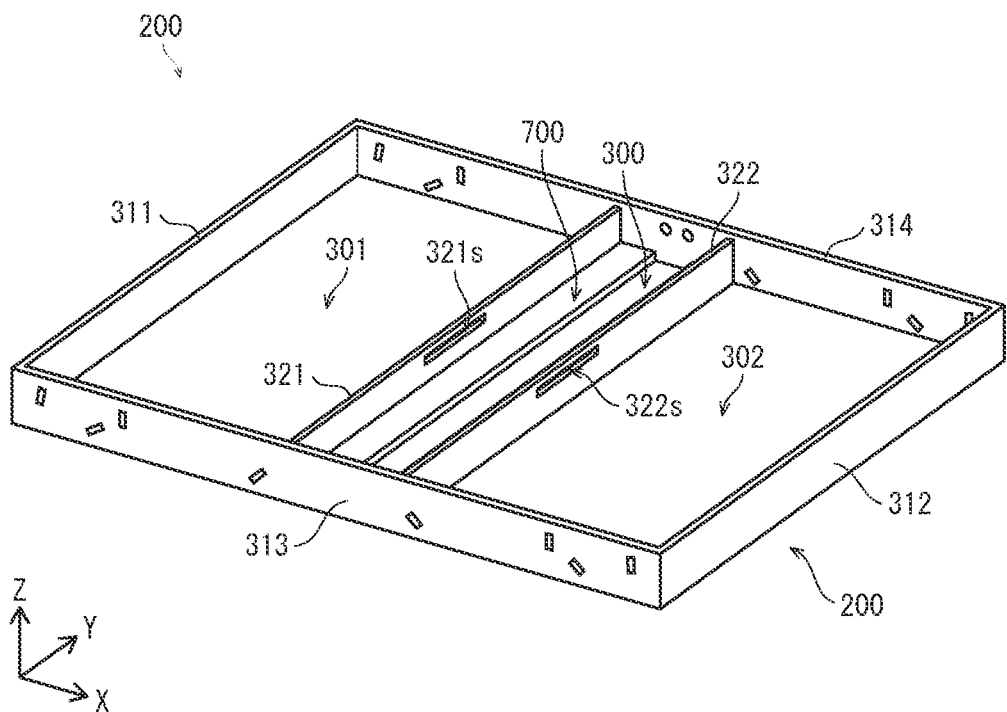
FIG. 7A is a perspective view diagram of the housing 200 pertaining to one or more embodiments.
Figure 7B:
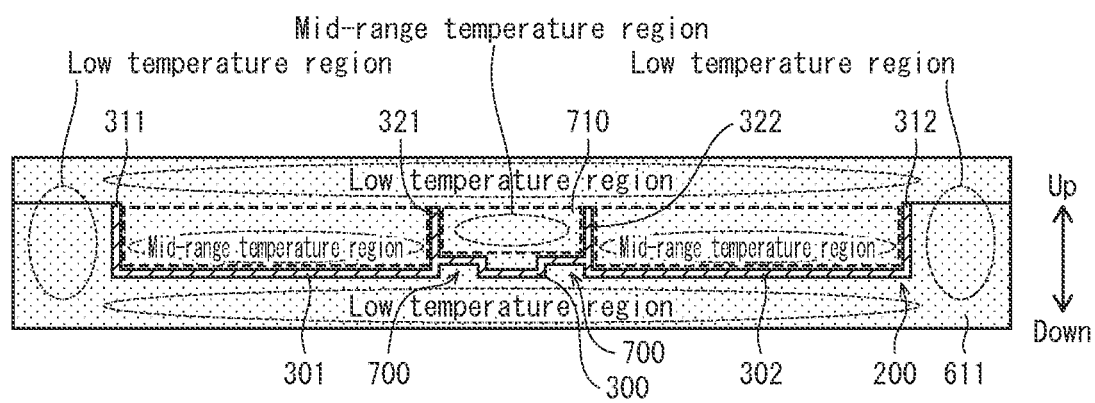
FIG. 7B is cross-section diagram illustrating a metal mold for injection molding of the housing 200.

As illustrated in FIG. 7A, steps 700 are provided in a central portion in direction X of the bottom plate 300 of the housing 200. According to this structure, a surface area of the bottom plate 300 that is not part of the steps 700 is decreased, relative to a surface area of the bottom plate 300 when not provided with the steps 700. Accordingly, a temperature of a portion of a space 710 in contact with the bottom plate 300 other than the steps 700 can be lowered, as illustrated in FIG. 7B. Accordingly, a temperature difference between a space 710-side and a low-temperature region 611-side of the bottom plate 300 becomes small, and therefore warping of the bottom plate 300 can be suppressed.

By provision of the steps 700, rigidity of the bottom plate 300 can be increased, and therefore this also contributes to suppression of warping of the bottom plate 300. Further, the portion of the bottom plate 300 other than the steps 700 is recessed with respect to the steps 700, and therefore can be used as a reception portion for housing a deflection motor that provides rotational drive to a deflection mirror 801.

The following describes additional embodiments of the present invention. An image forming device pertaining to one or more embodiments described below is characterized in that optical elements and side walls are disposed on both sides of the bottom plate 300 of the housing 200.

Figure 8A:
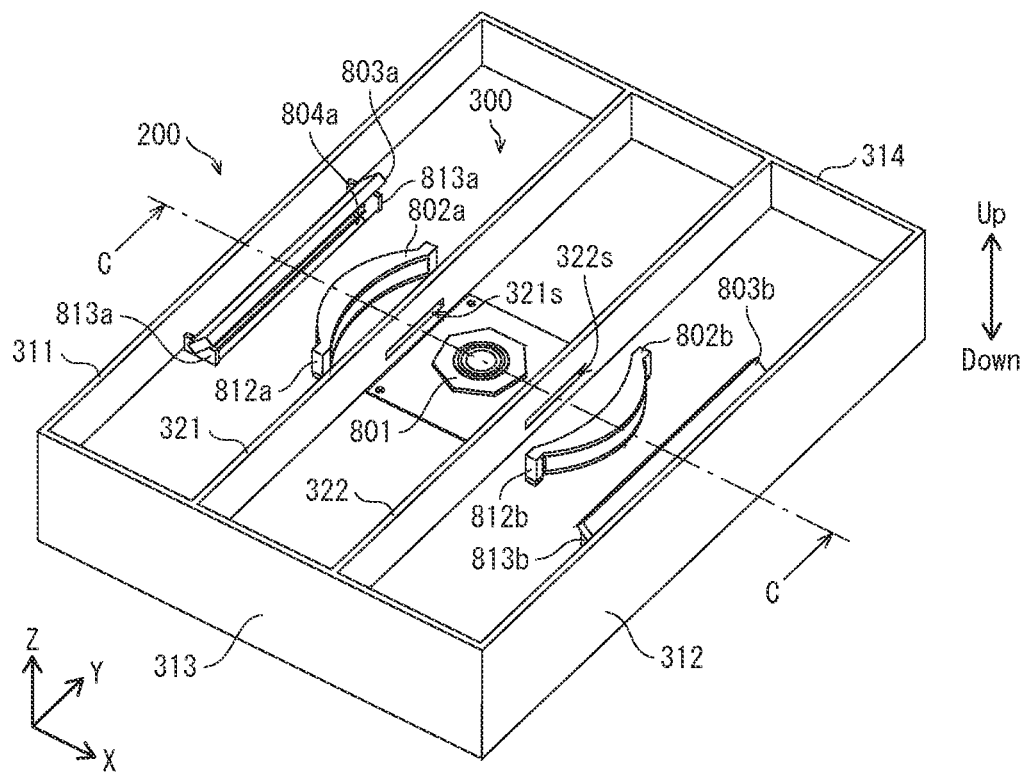
FIG. 8A is a perspective view diagram from above of the housing 200 pertaining to one or more embodiments of the present invention.

As illustrated in FIG. 8A, the housing 200 pertaining to one or more embodiments includes the side walls 311, 312, 313, 314 standing upright around the periphery of the bottom plate 300, which is rectangular. The side walls 311, 312, 313, 314 are not just on a side above the bottom plate 300, but also extend to a side below the bottom plate 300 in direction Z. According to one or more embodiments, the side above the bottom plate 300 refers to, among two main surfaces of the bottom plate 300, the side of a main surface on which the deflection mirror 801 is disposed, while the side below the bottom plate 300 refers to the opposite side in direction Z of the bottom plate 300 to said main surface.

Figure 9:
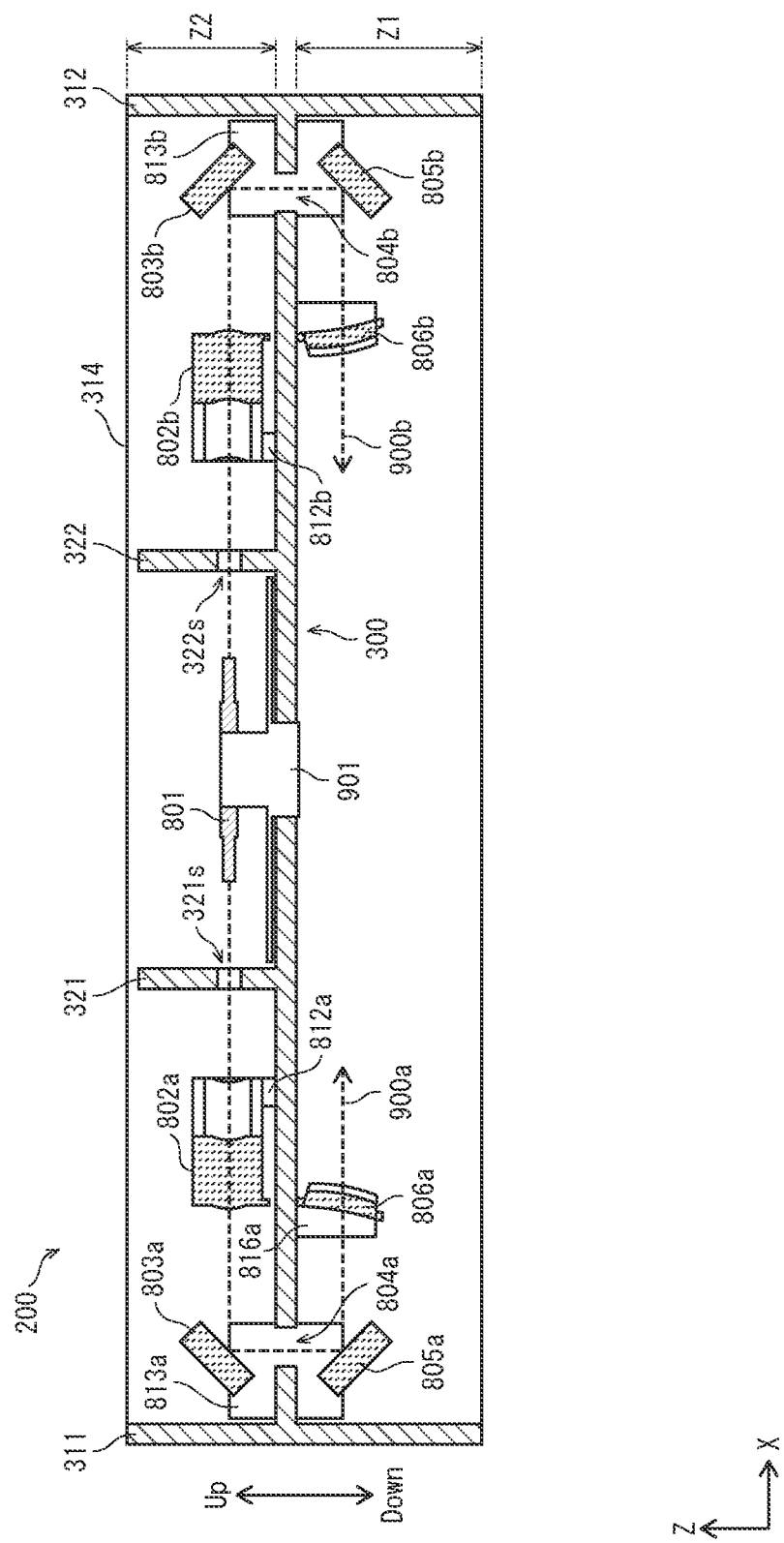
FIG. 9 is a cross-section diagram of the housing 200 taken along a line C-C in FIG. 8A.

As indicated in FIG. 9, height of the side walls 311, 312, 313, 314 is defined such that the distance above the bottom plate 300 is Z2 and the distance below the bottom plate 300 is Z1. The side walls 311, 312, 313, 314 are defined such that the distance below is taller than the distance above. In other words $$Z1 > Z2 \tag{1}$$

Regarding the optical scanning device 100 pertaining to one or more embodiments, a cover member (not illustrated) is attached above and below the bottom plate 300.

The ribs 321, 322 stand upright above the bottom plate 300. The ribs 321, 322 are elongated in direction Y, and ends of the ribs 321, 322 are connected to the side walls 313, 314. The slits 321s, 322s are provided in the ribs 321, 322 to allow light beams 900a, 900b to pass through. For convenience of attaching a cover member to ends of the side walls 311, 312, 313, 314, height of the ribs 321, 322 is equal to or less than the distance Z2 of the side walls 311, 312, 313, 314.

On the side above the bottom plate 300, the deflection mirror 801 is disposed in a central portion sandwiched by the ribs 321, 322. According to a rotational drive, the deflection mirror 801 reflects two light beams 900a, 900b emitted from a light source (not illustrated). The light beam 900a passes through the slit 321s and is incident on an fθ lens 802a. The fθ lens 802a functions as a scanning optical system. The light beam 900a transmitted through the fθ lens 802a is reflected by a reflection mirror 803a and passes through a slit 804a to the side below the bottom plate 300.

Figure 8B:
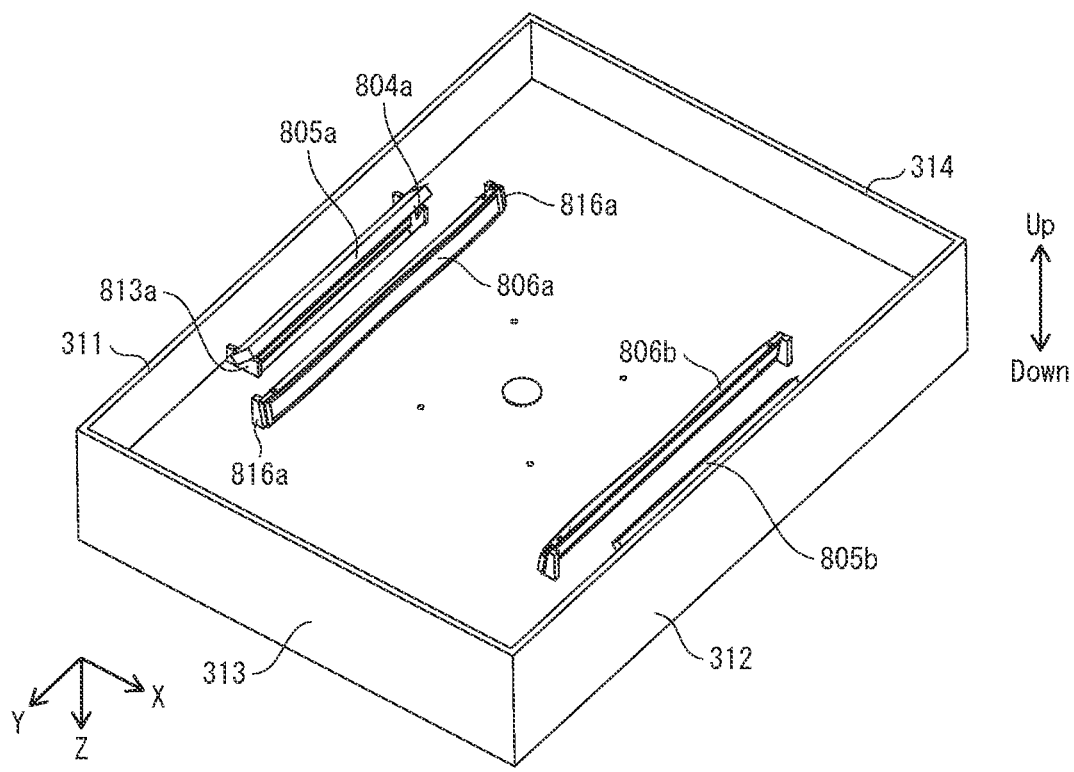
FIG. 8B is a perspective view diagram from below of the housing 200 pertaining to one or more embodiments of the present invention.

As illustrated in FIG. 8B, on the side below the bottom plate 300, the light beam 900a is reflected by a reflection mirror 805a and thereby guided to an fθ lens 806a. The light beam 900a transmitted through the fθ lens 806a is further guided to the photoreceptor drum 111Y, and exposes the circumferential surface of the photoreceptor drum 111Y to light.

Similarly to the light beam 900a, the light beam 900b exposes the circumferential surface of the photoreceptor drum 111M to light, via the slit 322s, an fθ lens 802b, a reflection mirror 803b, a slit 804b, a reflection mirror 805b, and an fθ lens 806b (FIG. 9). In order to expose to light the outer circumferential surfaces of the photoreceptor drums 111C, 111K, another optical scanning device 100 having a similar configuration is provided.

Figure 10:
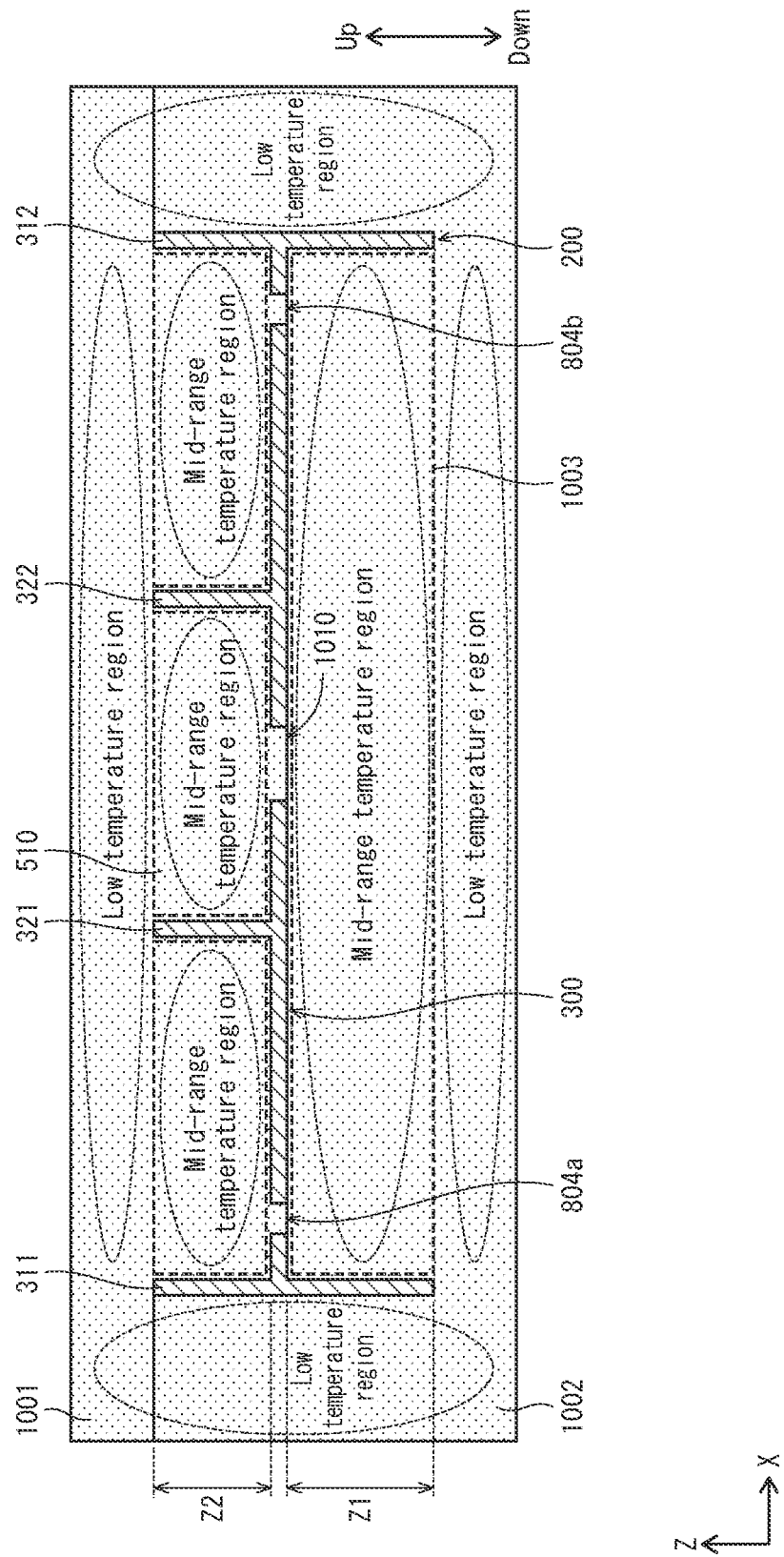
FIG. 10 is a cross-section diagram illustrating a metal mold for injection molding of the housing 200 pertaining to one or more embodiments of the present invention.

In injection molding of the housing 200 as described above, a combination of metal molds 1001, 1002 is used, as illustrated in FIG. 10. As described above, the side walls 311, 312, 313, 314 are not just above the bottom plate 300, but also extend below the bottom plate 300. Thus, in a space 1003 enclosed by the bottom plate 300 and the portions of the side walls 311, 312, 313, 314 on the side below the bottom plate 300, temperature decrease of the metal mold 1002 by heat dissipation is suppressed, and therefore becomes a mid-range temperature region.

In the space 510 enclosed by the ribs 321, 322 and the side walls 313, 314, height of the ribs 321, 322 is equal to or less than the distance Z2 of the portion of the side walls 313, 314 on the side above the bottom portion 300, and the distance Z2 is less than the distance Z1. Thus, because temperature of the space 510 tends to be lowered by heat dissipation to a low temperature region above, it is a mid-range temperature region. Accordingly, a temperature difference between the space 510 above the bottom plate 300 and the space 1003 below the bottom plate 300 becomes small.

A through hole 1010 for fitting a deflection motor 901 that provides rotational drive to the deflection mirror 801 is provided in a central portion in direction X and direction Y of the bottom plate 300, and heat can be conducted between the space 510 above the bottom plate 300 and the space 1003 below the bottom plate 300 via the through hole 1010. This heat conduction also contributes to decreasing a difference in heat between spaces above and below the bottom plate 300. Accordingly, warping of the bottom plate 300 is suppressed.

Further, according to conventional technology, when an optical element is disposed only above the bottom plate 300 and a light beam is reflected back, a distance between an optical element that receives a reflected beam and the bottom plate 300 is large. As a result, when a vibration range of the optical element caused by vibration of the bottom plate 300 becomes large, a light exposure position on the circumferential surface of the photoreceptor drum tends to become blurred, leading to deterioration in image quality.

In contrast, according to one or more embodiments, the light beams 900a, 900b reflected by the reflection mirrors 803a, 803b are received by an optical element disposed under the bottom plate 300, and therefore a distance between the optical element and the bottom plate 300 can be reduced. Accordingly, a vibration range of the optical element caused by vibration of the bottom plate 300 can be kept small, and therefore high image quality can be achieved.

Note that even if a light beam is not guided to the side below the bottom plate 300, the vibration range of the optical element caused by vibration of the bottom plate 300 can be kept small, but in this case, the area of the bottom plate 300 must be enlarged in order to secure a position of the optical element, which leads to an increase in size of the housing and the optical scanning device, which is contrary to the demand for space saving in image forming devices.

Further, according to one or more embodiments, a central portion of the bottom plate 300 between the ribs 321, 322 may be raised higher than both a portion of the bottom plate 300 between the rib 321 and the side wall 311 and a portion of the bottom plate 300 between the rib 322 and the side wall 312, and the central portion of the bottom plate 300 may incorporate a stepped portion. Thus, as per the description of the previously-described embodiments, metal mold temperature in the space 510 can be reduced.

Accordingly, even if the distance Z1 of the side walls 311, 312, 313, 314 is decreased, a temperature difference between above and below the bottom plate 300 can be made smaller to suppress warping of the bottom plate 300, and therefore as the housing 200 is miniaturized, it becomes possible to reduce size of the optical scanning device 100 and the image forming device 1.

The present invention is not limited to the previously-described embodiments, and includes at least the following modifications, described for illustration purposes only.

Embodiments are described above in which the through hole 600 is provided along an entire length in direction Y from the side wall 313 to the side wall 314, but the present invention is not limited to these embodiments. The through hole 600 may be provided to only a central portion in direction Y. The through hole 600 may be several discrete holes along direction Y.

Further, near the side walls 313, 314, molding material injected into portions corresponding to the side walls 313, 314 increases temperature of the metal mold 601, and therefore an interior of the space 610 is particularly likely to have a high temperature. Regarding this, if the through hole 600 is provided near the side walls 313, 314, or if width of the through hole 600 in direction X near the side walls 313, 314 is greater than width of the through hole 600 at a position more distant from the side walls 313, 314, it is possible to effectively lower temperature of the metal mold 601 at such positions. Accordingly, warping of the bottom plate 300 is suppressed and accuracy of dimensions can be improved.

Embodiments are described above in which a deflection motor is housed sandwiched between the bottom plate 300 and the steps 700, but the present invention is not limited to these embodiments. The following modifications may be made.

Figure 11:
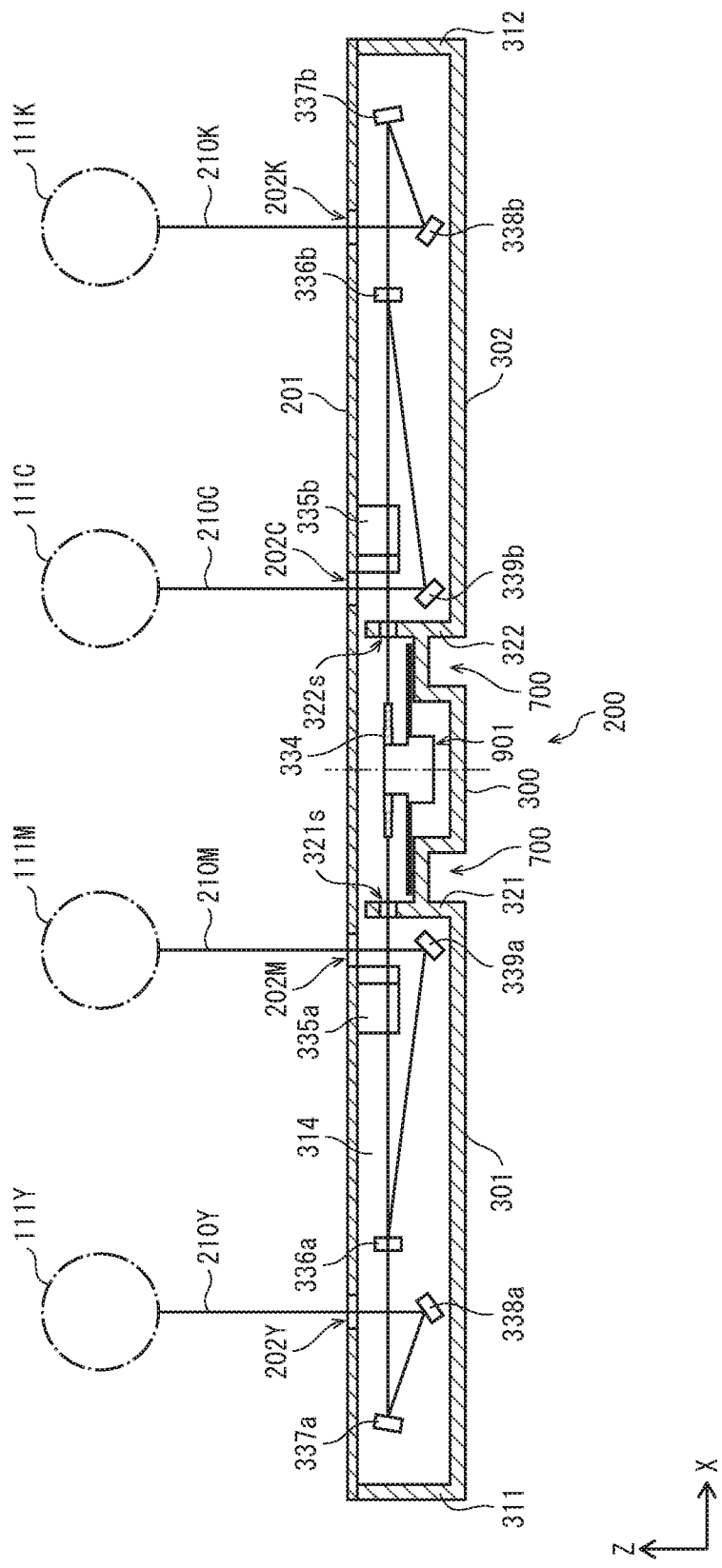
FIG. 11 is a cross-section diagram of the housing 200 pertaining to one or more embodiments of the present invention.
Figure 12:
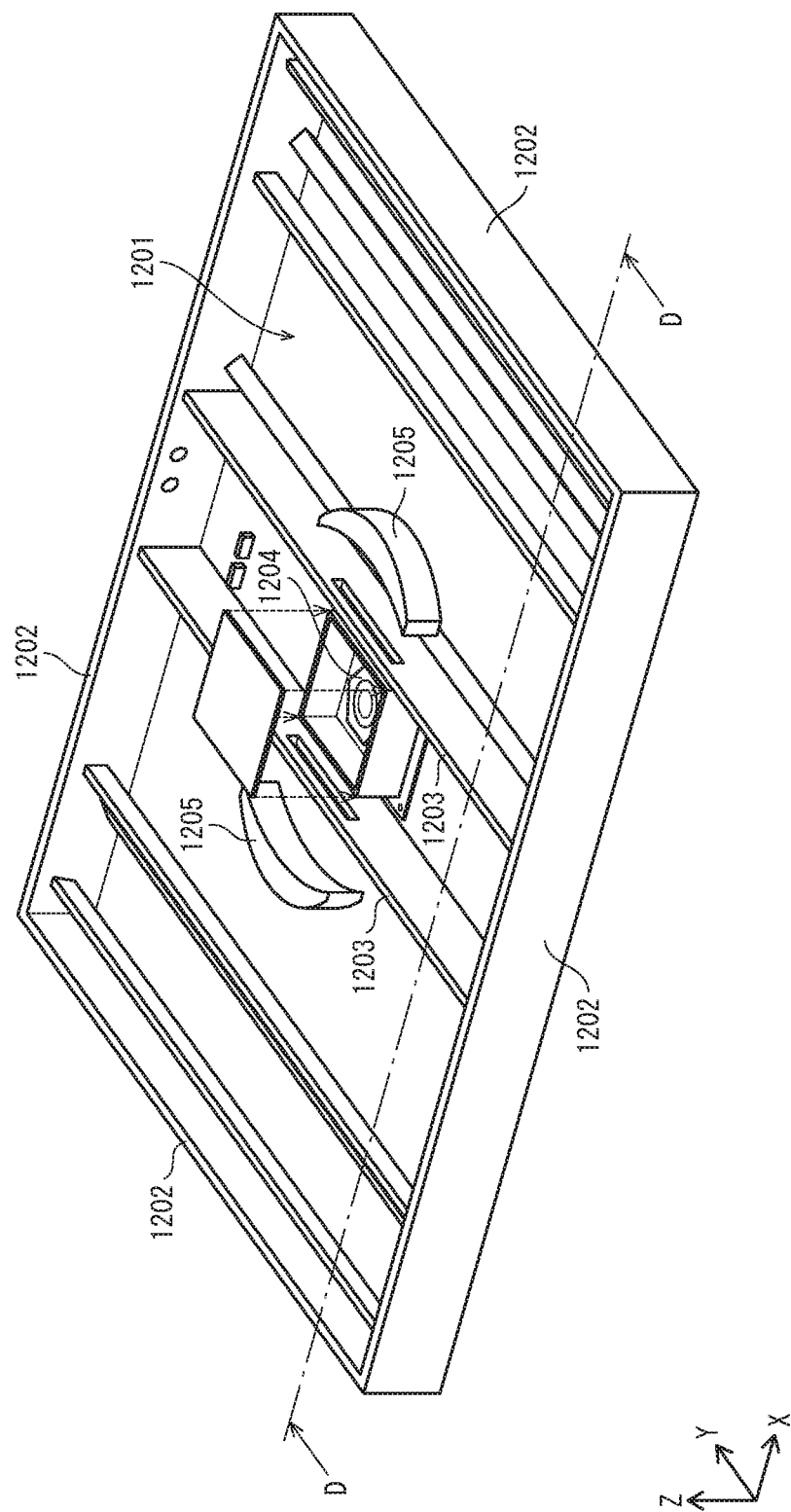
FIG. 12 is a perspective view diagram of a housing 12 pertaining to conventional technology.
Figure 13A:
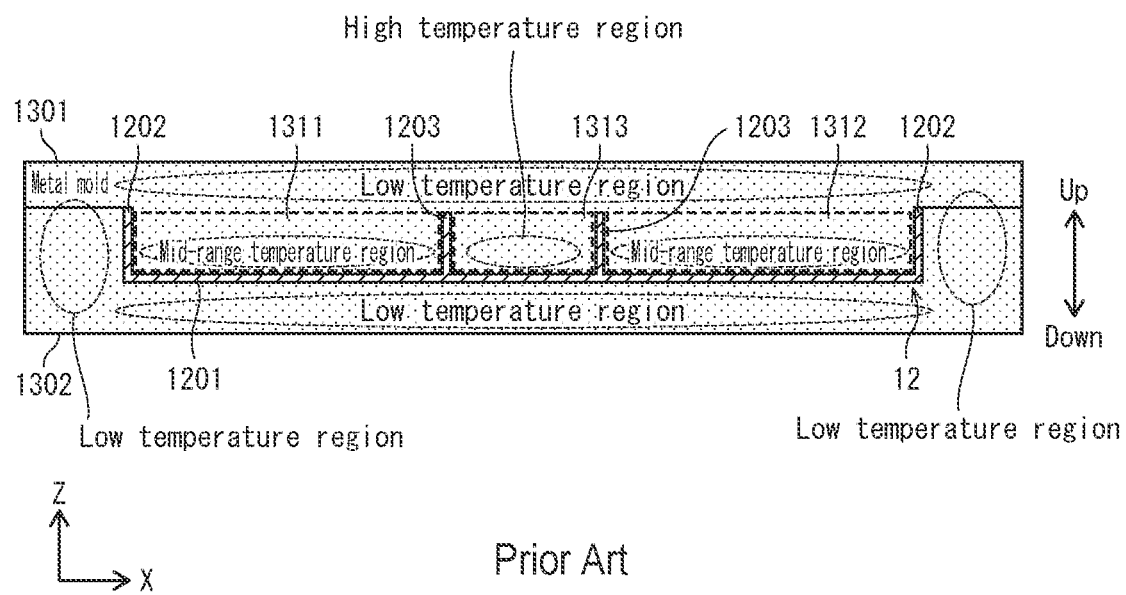
FIG. 13A is a cross-section diagram illustrating a metal mold for injection molding of the housing 12 pertaining to conventional technology, the cross-section corresponding to a line D-D in FIG. 12.
Figure 13B:
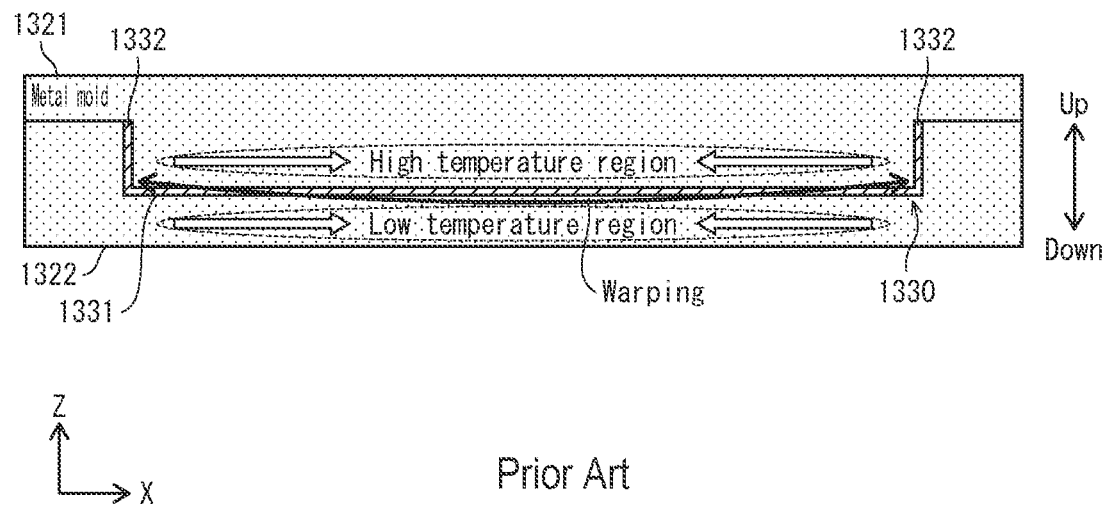
FIG. 13B is a cross-section diagram for explaining a mechanism of occurrence of warping of a bottom plate 1331 when injection molding of a housing 1330 including a bottom plate 1331 and a side wall 1332 is performed by using metal molds 1321, 1322.

For example, as illustrated in FIG. 11, a deflector including a deflection mirror 810 and a deflection motor 901 may be disposed on the steps 700. In this way, a position of the deflection mirror 801 in direction Z can be freely adjusted according to arrangement of the scanning optical systems 335a, 335b, and the like. Further, warping of the bottom plate 300 can be suppressed and flatness improved, and therefore it is possible to adjust position of the deflection mirror 801 in direction Z with high accuracy.

Further, rigidity of the bottom plate 300 can be increased by provision of the steps 700, and this can also contribute to increasing rigidity of a portion holding the deflector.

Embodiments are described of providing the steps 700 such that portions of the bottom plate 300 near the ribs 321, 322 are higher in direction Z and a central portion of the bottom plate 300 in direction X is lower in direction Z, but the present invention is not limited to these embodiments. Steps may be provided such that portions of the bottom plate 300 near the ribs 321, 322 are lower in direction A and a central portion of the bottom plate 300 in direction X is higher in direction Z. In this way, the advantageous effect as of the previously-described embodiments can be achieved.

Embodiments are described above in which the ribs 321, 322 are present only above the bottom plate 300, but the present invention is not limited to these embodiments. The ribs 321, 322 may extend below the bottom plate 300.

Further, when the distance Z2 and the distance Z1 of the side walls 311, 312, 313, 314, and the structure of the housing 200 are plane-symmetrical with respect to the bottom plate 300, a temperature difference between above and below a central portion of the bottom plate 300 between the ribs 321, 322 is decreased, and warping of the bottom plate 300 can be suppressed. Further, the distance Z1 of the side walls 311, 312, 313, 314 below the bottom plate 300 can be decreased, and therefore the optical scanning device 100 can be miniaturized, leading to potential space saving for the image forming device 1.

As illustrated in FIG. 9, embodiments are described in which the fθ lens 805a is supported by a support member 812a, the reflection mirrors 803a, 805a are supported by a support member 813a, the fθ lens 806a is supported by a support member 816a, and similarly the fθ lens 805b, the reflecting mirrors 803b, 805b, and the fθ lens 806a are supported by support members 812b, 813b, but the present invention is not limited to these embodiments. A portion or all of the optical elements of the optical scanning device 100 may be directly supported by the bottom plate 300. In this way, a vibration range of the optical element caused by vibration of the bottom plate 300 can be made smaller, and therefore an improvement in image quality of an electrostatic latent image formed on the circumferential surface of the photoreceptor drum can be achieved.

Embodiments are described above in which the side walls 311, 312, 313, 314 are upright relative to the bottom plate 300 in the same positions both upwards and downwards, but the present invention is not limited to these embodiments. The following modifications may be made. That is, in any case in which walls stand upright only above or both above and below the bottom plate 300, a portion or all of the walls may be disposed in positions other than a circumference of the bottom plate 300, and/or in plan view from direction Z a portion or all of the walls above and below the bottom plate 300 may be disposed in different positions. The advantageous effects of one or more embodiments can be obtained irrespective of positions of the walls relative to the bottom plate 300.

Of course, the bottom plate 300 is not limited to a rectangular shape, and the optical scanning device 100 is not limited to a rectangular cuboid shape.

Embodiments are described above in which the through hole 1010 for fitting the deflection motor 901 is formed by using the metal molds 1001, 1002, but the present invention is not limited to these embodiments. After injection molding, the bottom plate 300 may be perforated to form the through hole 1010. In this case, heat conduction through the through hole 1010 does not occur at the time of injection molding, but according to the side walls 311, 312 extending below the bottom plate 300, the space 1003 becomes a mid-range temperature region. Thus, it is possible to reduce a temperature difference between the space 510 of the central portion between the ribs 321, 322 and the space 1003 below the bottom plate 300, and therefore warping of the bottom plate 300 can be suppressed.

According to the previously-described embodiments, various mold shapes for forming the housing 200 are illustrated, but the present invention is not limited to these embodiments. Other shapes of metal mold may of course be used. Further, a plurality of the housing 200 may be formed by using one set of metal molds. One or more embodiments of the present invention may be applied to such a case, and the advantageous effects achieved.

(4-9) Although not specifically mentioned above, if any of the scanning optical systems 335a, 335b, the light beam separators 336a, 336b, and the reflection mirrors 337a, 337b, 338a, 338b, 339a, 339b are directly fixed to the bottom plates 300, 301, 302 of the housing 200, the number of parts can be reduced relative to a structure in which they are fixed by support members, and therefore parts costs and manufacturing costs can be reduced.

However, when these optical elements are directly fixed to the bottom plates 300, 301, 302, accuracy of dimensions of the bottom plates 300, 301, 302 more easily affects optical accuracy and consequently image quality. As long as warping of the bottom plate 300 is reduced, as per one or more embodiments of the present invention, both cost reduction by direct fixing of optical elements and achievement of high image quality can be achieved.

Although not specifically mentioned above, a material of the housing 200 may be a resin such as Multilon DN-1525, Xyron, or the like, and may be a metal such as aluminum, magnesium, or the like.

The image forming device of the embodiments above is described as a tandem type digital color printer, but the present invention is not limited to these embodiments. The image forming device may be a digital color printer other than a tandem type, and may be a monochrome printer. Further, even if one or more embodiments of the present invention is applied to a single-function device such as a copier equipped with a scanner or a facsimile device equipped with a facsimile communication function, or a multi-function peripheral (MFP) having such functions, the advantageous effects can be achieved.

An optical scanning device pertaining to one or more embodiments is an optical scanning device including: a light source; a deflector that deflects light from the light source; an optical element that guides light deflected by the deflector on an optical path to a photosensitive member (photosensor); and a housing accommodating the deflector and the optical element. The housing is integrally formed and includes a bottom plate, a side wall standing upright from a periphery of a main surface of the bottom plate, and a pair of ribs parallel with each other and standing upright from the bottom plate, both longitudinal ends of each of the ribs in plan view being joined to the side wall. A region of the bottom plate between the ribs includes a portion displaced farther upward in an upright direction of the side wall than other regions of the bottom plate.

According to one or more embodiments, the portion is equal to an entirety of the region of the bottom plate between the ribs.

According to one or more embodiments, the portion is less than an entirety of the region of the bottom plate between the ribs, and the deflector is supported by the portion.

An optical scanning device pertaining to one or more embodiments is an optical scanning device including: a light source; a deflector that deflects light from the light source; an optical element that guides light deflected by the deflector on an optical path to a photosensitive member; and a housing accommodating the deflector and the optical element. The housing is integrally formed and includes a bottom plate, a side wall standing upright from a periphery of a main surface of the bottom plate, and a pair of ribs parallel with each other and standing upright from the bottom plate, both longitudinal ends of each of the ribs in plan view being joined to the side wall. A region of the bottom plate between the ribs includes a through hole.

According to one or more embodiments, a portion of the deflector is in the through hole and the deflector is supported by a portion of the bottom plate surrounding the through hole.

According to one or more embodiments, the main surface is a first main surface and a second main surface of the bottom plate is opposite the first main surface, and the housing further includes a standing wall extending from the second main surface of the bottom plate.

An optical scanning device pertaining to one or more embodiments is an optical scanning device including: a light source; a deflector that deflects light from the light source; an optical element that guides light deflected by the deflector on an optical path to a photosensitive member; and a housing accommodating the deflector and the optical element. The housing is integrally formed to include a bottom plate, a side wall standing upright from a periphery of a first main surface of the bottom plate, a pair of ribs parallel with each other and standing upright from the bottom plate, both longitudinal ends of each of the ribs in plan view being joined to the side wall, and a standing wall extending from a second main surface of the bottom plate opposite the first main surface.

According to one or more embodiments, the standing wall extends from a periphery of the second main surface of the bottom plate.

According to one or more embodiments, perpendicular to the first main surface of the bottom plate, a distance $Z1$ from the second main surface of the bottom plate to an end of the standing wall farthest from the bottom plate is greater than a distance Z2 from the first main surface of the bottom plate to an end of the side wall farthest from the bottom plate.

According to one or more embodiments, the optical element is directly fixed to the main surface of the bottom plate.

According to one or more embodiments, the optical scanning device further includes a second optical element. The main surface is a first main surface, a second main surface of the bottom plate is opposite the first main surface, and the optical element is a first optical element. The second optical element guides light deflected by the deflector and guided by the first optical element on the optical path to the photosensitive member. The second optical element is disposed on the second main surface.

An image forming device pertaining to one or more embodiments is an image forming device including an optical scanning device and an image forming unit that forms an electrostatic latent image by using light emitted by the optical scanning device. The optical scanning device includes: a light source; a deflector that deflects light from the light source; an optical element that guides light deflected by the deflector on an optical path to a photosensitive member; and a housing accommodating the deflector and the optical element. The housing is integrally formed and includes a bottom plate, a side wall standing upright from a periphery of a main surface of the bottom plate, and a pair of ribs parallel with each other and standing upright from the bottom plate, both longitudinal ends of each of the ribs in plan view being joined to the side wall. A region of the bottom plate between the ribs includes a portion displaced farther upward in an upright direction of the side wall than other regions of the bottom plate.

Thus, warping caused by a difference in shrinkage due to a temperature difference between upper and lower surfaces of a housing bottom plate is suppressed, and therefore accuracy of housing dimensions is ensured, shifts in positional relationships between a deflector and optical elements are suppressed, and beam performance on an image plane is ensured.

Although embodiments of the present invention have been described and illustrated in detail, the previously-described embodiments are made for purposes of illustration and example only and not limitation. The scope of the present invention should be interpreted by terms of the appended claims.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An optical scanning device comprising:
a light source;
a deflector that deflects light from the light source;
an optical element that guides light deflected by the deflector on an optical path to a photosensor; and
a housing that accommodates the deflector and the optical element, wherein
the housing is integrally formed and comprises:
a bottom plate;
a side wall standing upright from a periphery of a main surface of the bottom plate; and
a pair of ribs parallel with each other and standing upright from the bottom plate,
both longitudinal ends of each of the ribs in plan view are joined to the side wall, and
a region of the bottom plate between the ribs in the plan view has a portion displaced farther upward in an upright direction of the side wall than other regions of the bottom plate.

2. The optical scanning device of claim 1, wherein the portion is equal to an entirety of the region of the bottom plate between the ribs.

3. The optical scanning device of claim 1, wherein
the portion is smaller than an entirety of the region of the bottom plate between the ribs, and
the deflector is supported by the portion.

4. The optical scanning device of claim 1, wherein
the bottom plate has a first main surface as the main surface and a second main surface opposite to the first main surface, and
the housing further includes a standing wall extending from the second main surface of the bottom plate.

5. The optical scanning device of claim 1, wherein the optical element is directly fixed to the main surface of the bottom plate.

6. The optical scanning device of claim 1, wherein
the bottom plate has a first main surface as the main surface and a second main surface opposite to the first main surface,
the optical element comprises a first optical element disposed on the first main surface and a second optical element disposed on the second main surface, and
the second optical element guides light deflected by the deflector and guided by the first optical element on the optical path to the photosensor.

7. An optical scanning device comprising:
a light source;
a deflector that deflects light from the light source;
an optical element that guides light deflected by the deflector on an optical path to a photosensor; and
a housing that accommodates the deflector and the optical element, wherein
the housing is integrally formed and comprises:
a bottom plate;
a side wall standing upright from a periphery of a main surface of the bottom plate; and
a pair of ribs parallel with each other and standing upright from the bottom plate,
both longitudinal ends of each of the ribs in plan view are joined to the side wall, and
a region of the bottom plate between the ribs has a through hole.

8. The optical scanning device of claim 7, wherein the deflector is partially disposed in the through hole and supported by a part of the bottom plate around the through hole.

9. The optical scanning device of claim 7, wherein
the bottom plate has a first main surface as the main surface and a second main surface opposite to the first main surface, and
the housing further includes a standing wall extending from the second main surface of the bottom plate.

10. The optical scanning device of claim 9, wherein the standing wall extends from a periphery of the second main surface of the bottom plate.

11. The optical scanning device of claim 9, wherein a distance Z1 from the second main surface to an end of the standing wall farthest from the second main surface is greater than a distance Z2 from the first main surface to an end of the side wall farthest from the first main surface.

12. The optical scanning device of claim 7, wherein the optical element is directly fixed to the main surface of the bottom plate.

13. The optical scanning device of claim 7, wherein
the bottom plate has a first main surface as the main surface and a second main surface opposite to the first main surface,
the optical element comprises a first optical element disposed on the first main surface and a second optical element disposed on the second main surface,
the second optical element guides light deflected by the deflector and guided by the first optical element on the optical path to the photosensor.

14. An optical scanning device comprising:
a light source;
a deflector that deflects light from the light source;
an optical element that guides light deflected by the deflector on an optical path to a photosensor; and
a housing that accommodates the deflector and the optical element, wherein
the housing is integrally formed to comprise:
a bottom plate;
a side wall standing upright from a periphery of a first main surface of the bottom plate; and
a pair of ribs parallel with each other and standing upright from the bottom plate,
both longitudinal ends of each of the ribs in plan view are joined to the side wall,
a standing wall extends from a second main surface opposite to the first main surface of the bottom plate, and
a distance Z1 from the second main surface to an end of the standing wall farthest from the second main surface is greater than a distance Z2 from the first main surface to an end of the side wall farthest from the first main surface.

15. The optical scanning device of claim 14, wherein the standing wall extends from a periphery of the second main surface of the bottom plate.

16. The optical scanning device of claim 14, wherein the optical element is directly fixed to the first main surface of the bottom plate.

17. The optical scanning device of claim 14, wherein
the optical element comprises a first optical element disposed on the first main surface and a second optical element disposed on the second main surface, and
the second optical element guides light deflected by the deflector and guided by the first optical element on the optical path to the photosensor.

18. An image forming device comprising:
an optical scanning device; and
an image forming unit that forms an electrostatic latent image by using light emitted by the optical scanning device,
wherein the optical scanning device comprising:
a light source;
a deflector that deflects light from the light source;
an optical element that guides light deflected by the deflector on an optical path to a photosensor; and
a housing that accommodates the deflector and the optical element, wherein
the housing is integrally formed and comprises:
a bottom plate;
a side wall standing upright from a periphery of a main surface of the bottom plate; and
a pair of ribs parallel with each other and standing upright from the bottom plate,
both longitudinal ends of each of the ribs in plan view are joined to the side wall, and
a region of the bottom plate between the ribs in the plan view has a portion displaced farther upward in an upright direction of the side wall than other regions of the bottom plate.

19. An image forming device comprising:
an optical scanning device; and
an image forming unit that forms an electrostatic latent image by using light emitted by the optical scanning device,
wherein the optical scanning device comprising:
a light source;
a deflector that deflects light from the light source;
an optical element that guides light deflected by the deflector on an optical path to a photosensor; and
a housing that accommodates the deflector and the optical element, wherein
the housing is integrally formed and comprises:
a bottom plate;
a side wall standing upright from a periphery of a main surface of the bottom plate; and
a pair of ribs parallel with each other and standing upright from the bottom plate,
both longitudinal ends of each of the ribs in plan view are joined to the side wall, and
a region of the bottom plate between the ribs has a through hole.

20. An image forming device comprising:
an optical scanning device; and
an image forming unit that forms an electrostatic latent image by using light emitted by the optical scanning device, wherein
the optical scanning device comprising:
a light source;
a deflector that deflects light from the light source;
an optical element that guides light deflected by the deflector on an optical path to a photosensor; and
a housing that accommodates the deflector and the optical element, wherein
the housing is integrally formed to comprise:
a bottom plate;
a side wall standing upright from a periphery of a first main surface of the bottom plate; and
a pair of ribs parallel with each other and standing upright from the bottom plate,
both longitudinal ends of each of the ribs in plan view are joined to the side wall,
a standing wall extends from a second main surface opposite to the first main surface of the bottom plate, and
a distance Z1 from the second main surface to an end of the standing wall farthest from the second main surface is greater than a distance Z2 from the first main surface to an end of the side wall farthest from the first main surface.

\* \* \* \* \*